(12) United States Patent
Rockwell

(10) Patent No.: US 8,017,535 B2
(45) Date of Patent: Sep. 13, 2011

(54) WATER-SOLUBLE MOISTURE ADDITION TO ENHANCE MOLDING, STIFFNESS, AND SURFACE PROCESSING OF POLYMER MATERIALS

(75) Inventor: Anthony L. Rockwell, Pickerington, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 494 days.

(21) Appl. No.: 11/638,795

(22) Filed: Dec. 14, 2006

(65) Prior Publication Data
US 2008/0145630 A1 Jun. 19, 2008

(51) Int. Cl.
*D04H 1/00* (2006.01)
(52) U.S. Cl. .......... 442/415; 442/361; 428/218
(58) Field of Classification Search .......... 442/361, 442/362–364, 415
See application file for complete search history.

(56) References Cited

U.S. PATENT DOCUMENTS

| | | |
|---|---|---|
| 2,673,370 A | 3/1954 | Goss |
| 2,951,260 A | 9/1960 | Harrison et al. |
| 3,608,056 A | 9/1971 | Nelson |
| 3,639,549 A | 2/1972 | Tuqwell |
| 3,758,357 A | 9/1973 | Akerson et al. |
| 3,937,610 A | 2/1976 | Farrell |
| 4,134,948 A | 1/1979 | Baker, Jr. |
| 4,141,882 A | 2/1979 | Kodama et al. |
| 4,306,929 A | 12/1981 | Menikheim et al. |
| 4,519,975 A | 5/1985 | Neumann |
| 4,576,852 A | 3/1986 | Burgess et al. |
| 4,673,697 A * | 6/1987 | Rowley .......... 523/218 |
| 5,026,512 A | 6/1991 | Chang |
| 5,068,274 A | 11/1991 | Efner |
| 5,091,457 A | 2/1992 | Efner |
| 5,093,051 A | 3/1992 | Reiniger |
| 5,208,277 A | 5/1993 | Boudreaux, Jr. |
| 5,679,381 A | 10/1997 | Andersen et al. |

(Continued)

FOREIGN PATENT DOCUMENTS
DE 10141381 3/2003
(Continued)

OTHER PUBLICATIONS

International Search Report and Written Opinion from PCT/US07/25536 dated Apr. 1, 2008.

*Primary Examiner* — Lynda Salvatore
(74) *Attorney, Agent, or Firm* — Calfee, Halter & Griswold LLP

(57) ABSTRACT

Densified non-woven materials having acoustic and thermal properties are provided. The non-woven material is formed of a thermoplastic material or fibers and a thermoplastic material. The fibers may be an organic, inorganic, or thermoplastic fiber and are desirably devoid of conventional sizing compositions. The densified portion of the non-woven material is formed by applying a moisture additive and subsequently applying heat. Heating the non-woven material causes the water in the moisture additive to turn to steam, which causes a molecular change in the polymer based thermoplastic material(s) of the non-woven material that was treated with the moisture additive. The moisture additive is preferably water, but may include a dilute alkali, a dilute acid, or additives to enhance surface, fire, or mold release characteristics. The water additive may be utilized to surface treat, partially treat, or completely treat the air-laid mat to achieve desired acoustic or thermal properties and/or stiffness.

15 Claims, 3 Drawing Sheets

U.S. PATENT DOCUMENTS

| | | | |
|---|---|---|---|
| 5,719,239 A * | 2/1998 | Mirous et al. | 525/427 |
| 5,879,722 A | 3/1999 | Andersen et al. | |
| 6,221,798 B1 | 4/2001 | Mahale et al. | |
| 6,406,649 B1 | 6/2002 | Fisk | |
| 6,683,123 B1 | 1/2004 | Kozlowski | |
| 6,755,999 B2 | 6/2004 | Su | |
| 7,138,023 B2 * | 11/2006 | Haque et al. | 156/148 |
| 2003/0151168 A1 | 8/2003 | Gohl et al. | |
| 2004/0087928 A1 * | 5/2004 | Ducker | 604/385.01 |
| 2005/0082721 A1 | 4/2005 | Haque | |
| 2006/0137799 A1 * | 6/2006 | Haque et al. | 156/62.2 |
| 2006/0141260 A1 * | 6/2006 | Haque et al. | 428/412 |

FOREIGN PATENT DOCUMENTS

| | | |
|---|---|---|
| JP | 2004114655 | 4/2004 |
| WO | 2008/073497 | 6/2008 |

* cited by examiner

WATER-SOLUBLE MOISTURE ADDITION TO ENHANCE MOLDING, STIFFNESS, AND SURFACE PROCESSING OF POLYMER MATERIALS

TECHNICAL FIELD AND INDUSTRIAL APPLICABILITY OF THE INVENTION

The present invention relates generally to acoustic and thermal products, and more particularly to the addition of low levels of moisture to the surface of an air-laid mat to aid in processing and to enhance the rigidity of the mat.

BACKGROUND OF THE INVENTION

Thermoplastic blanket materials are well known in the art and are used in a variety of settings where it is desired to dampen noise from an external source. For example, thermoplastic blanket materials have been used in applications such as in appliances to reduce the sound emitted into the surrounding areas of a home, in automobiles to reduce mechanical sounds of the motor and road noise, and in office buildings to attenuate sound generated from the workplace, such as from telephone conversations or from the operation of office equipment. Acoustical insulation materials typically relies upon both sound absorption (i.e., the ability to absorb incident sound waves) and transmission loss (i.e., the ability to reflect incident sound waves) to provide adequate sound attenuation.

Conventional acoustical insulation materials include materials such as foams, compressed fibers, fiberglass batts, felts, and nonwoven webs of fibers such as meltblown fibers. Laminates formed of one or more layers of the thermoplastic blanket materials provide the desired acoustical and insulating properties and one or more additional layers of a rigid material provide desired mechanical strength properties and permit simple and convenient installation as well as proper functional performance. Such thermoplastic blanket materials may be used in the walls of single family homes and commercial buildings to both insulate and reduce sound emission from the rooms.

Relatively higher density board products produced from thermoplastic blanket materials may be utilized as structural parts for appliances, office screen partitions, in hood liners, head liners, and in other automotive and truck applications. An example of such a densified board formed from a thermoplastic blanket material is described in U.S. Ser. No. 2004/0265553 and U.S. Ser. No. 2005/0136235 to Rockwell, et al. In these applications, a thermoplastic blanket is densified on at least one surface by passing the insulation blanket between two or more heated platens. Heat and pressure is applied to the insulation blanket by the platens to form a densified surface having a desired thickness. After heating the insulation blanket, the densified blanket may then be cooled, such as by passing the densified blanket between cooling platens.

Although densified forms of thermoplastic blanket materials exist, there remains a need in the art for a method of forming a densified thermoplastic product that allows for a reduction in heating time, more homogenous heating throughout the thermoplastic product, and a stiffer final product.

SUMMARY OF THE INVENTION

It is an object of the present invention to provide a densified non-woven material formed of (1) thermoplastic fibers or (2) reinforcement fibers and a thermoplastic material. The reinforcement fibers may be any organic or inorganic material. Preferably, the reinforcement fibers are glass fibers. The densified portion of the non-woven material is formed by the application of a moisture additive and the subsequent application of heat. The moisture additive is preferably water, but may include components to enhance surface, fire, or mold release characteristics. Heating the non-woven material turns the water in the moisture additive into steam. The steam, in turn, quickly heats the surface of the non-woven material, causing a molecular change in the polymer based thermoplastic material of the non-woven material that was treated with the moisture additive. If the moisture additive is applied to a first major surface (i.e., top surface), the molecular change in the polymer based thermoplastic material causes a portion extending from the surface of the non-woven material to become rigid, thereby forming a stiff portion having a certain thickness extending from the first major surface. The degree of penetration of the moisture additive is directly correlated to the depth of molecular change of the thermoplastic polymer material. Therefore, the more moisture additive that is applied to the surface of the non-woven material, the greater the degree of penetration and molecular change of the thermoplastic polymer component of the non-woven material. To completely treat the non-woven material and form a densified, board-like product, the moisture additive may be applied to a second major surface (i.e., bottom surface). Heat causes the water in the moisture additive to turn into steam, which rapidly heats the second major surface of the non-woven material and rises through the mat, causing a molecular change in the polymer based thermoplastic material throughout the non-woven material. The addition of moisture to the surface of the non-woven material reduces both the heat cycle time and the cost of manufacturing the final product compared to conventional steam molding processes.

It is also an object of the present invention to provide an acoustic product that includes a densified non-woven material having a plurality of densified thermoplastic fibers. Any type of fiber suitable for providing good acoustic and thermal properties may be used to form the non-woven material. The non-woven material may be densified by the application of a moisture additive and the subsequent application of heat. The moisture additive is preferably water, however, a dilute acid or a dilute alkali may be included as a component. In addition, the moisture additive may include additives to enhance surface, fire, or mold release characteristics. Heating the non-woven material turns the water in the moisture additive into steam, which causes a molecular change in the polymer based thermoplastic material of the non-woven material treated with the moisture additive. The molecular change in the thermoplastic polymer causes the portions of the non-woven material treated with the moisture additive to become stiff or rigid (i.e., densified).

It is a further object of the present invention to provide methods of forming a densified non-woven material. To form a densified non-woven material in which a portion of the mat is densified, a moisture additive is applied to a first major surface (i.e., top surface) of the non-woven material. The moisture additive may include water and a dilute acid or a dilute alkali. Additional components may be added to the moisture additive to enhance surface, fire, or mold release characteristics. The treated non-woven material is then rapidly heated to turn the water in the moisture additive into steam. The steam quickly heats the surface of the non-woven material, causing a molecular change in the polymer based thermoplastic material of the non-woven material that was treated with the moisture additive. The degree of penetration of the moisture additive is directly correlated to the depth of molecular change of the thermoplastic polymer material. The stiffened layer or portion formed by the molecular change of the polymer in the thermoplastic fibers has a desired thickness dependent upon the amount of moisture additive applied to the first major surface. The thickness may be any thickness that extends partially into the non-woven material. To form a board-like product, the moisture additive may be applied to a second major surface (i.e., bottom surface) of the non-woven material. Steam generated by the application of heat to the non-woven material rises through the mat and molecularly changes the polymer in the thermoplastic fibers throughout the thickness of the non-woven material.

It is an advantage of the present invention that the addition of the moisture additive to a non-woven material reduces the heat cycle time, thereby lowering processing time and manufacturing costs.

It is another advantage of the present invention that non-woven materials processed with the moisture additive forms a product that possesses increased rigidity compared to conventionally steam treated acoustic products.

It is yet another advantage of the present invention that the rigid surface(s) of the acoustical product are void of loose fibers that may catch on objects and pull out of the product during installation.

It is a further advantage of the present invention that the inventive method permits the formation of a rigid surface without the use of boilers or steam generators utilized in conventional steam molding techniques.

It is a feature of the present invention that a non-woven material formed entirely of polymer based materials or of polymer based materials and other materials such as glass fibers and treated with the moisture additive approaches the stiffness of a molded fiberglass product.

It is another feature of the present invention that the application of the moisture additive permits an acoustic product to be converted into a board-like product having both acoustic, thermal, and structural properties.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
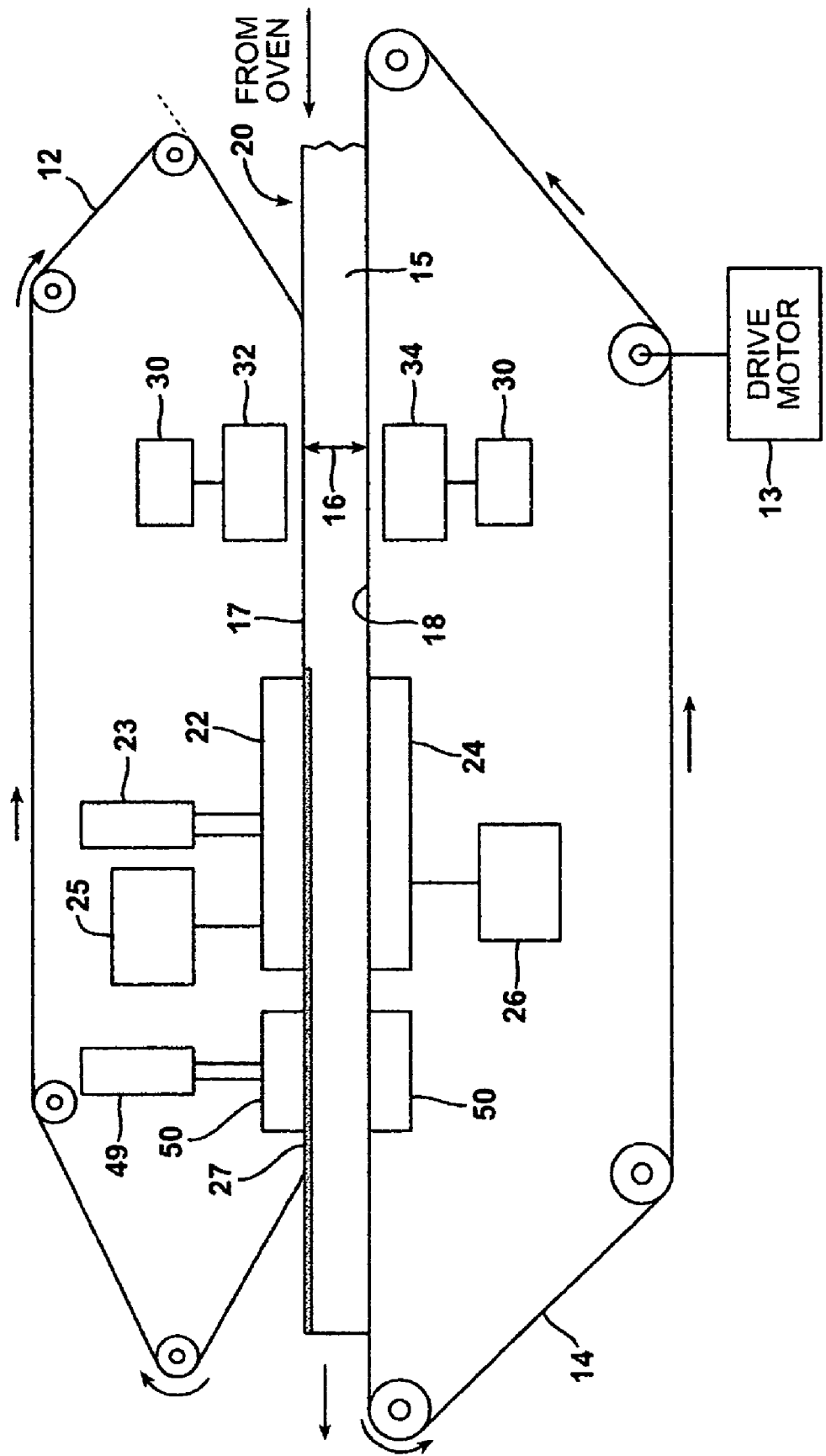
FIG. 1 is a schematic illustration of an apparatus for the application of a moisture additive to a first major surface and subsequent densification of an air-laid mat.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. In the drawings, the thickness of the lines, layers, and regions may be exaggerated for clarity. It is to be noted that like numbers found throughout the figures denote like elements.

The present invention relates to the addition of low levels of a moisture additive to the surface of a non-woven material formed of (1) thermoplastic materials (e.g., thermoplastic fibers) or (2) fibers and thermoplastic materials to enhance the rigidity of the final acoustic or thermal product and/or to aid in processing. As used herein, the term "non-woven material" includes air-laid mats, mats formed by a garnet/carding process (single layer or multiple layers), high loft wet laid veils, and multiple layer wet laid veils formed of the same type of thermoplastic materials. The addition of moisture to the surface of the non-woven material reduces both the heat cycle time and the cost of manufacturing the final product compared to conventional steam molding processes. Additives may be applied to the surface of the non-woven material together with the moisture additive and may include components to enhance surface, fire, or mold release characteristics. The moisture additive may be added to the non-woven material at a molding facility or prior to any additional surface processing enhancements.

The fibers used to form the non-woven material may be any type of fiber suitable for providing good acoustical and thermal properties. The fibers may be any type of organic, inorganic, or thermoplastic fiber. The type of organic and inorganic fiber used is not particularly limited, and examples of fibers suitable for use in the non-woven material include glass fibers, wool glass fibers, natural fibers, metal fibers, ceramic fibers, mineral fibers, carbon fibers, graphite fibers, nylon fibers, and/or rayon fibers. Examples of polymer based thermoplastic fibers include, but are not limited to, polyester fibers, polyethylene fibers, polypropylene fibers, polyethylene terephthalate (PET) fibers, and mixtures thereof. The term "natural fiber" as used in conjunction with the present application refers to plant fibers extracted from any part of a plant such as the stem, seeds, leaves, roots, or phloem. Examples of natural fibers suitable for use as the fiber material include cotton, jute, bamboo, ramie, bagasse, hemp, coir, linen, kenaf, sisal, flax, henequen, and combinations thereof. One or more types of organic, inorganic, and/or thermoplastic materials may be used to form the non-woven material.

The thermoplastic material may also be in the form of multicomponent fibers such as bicomponent polymer fibers, tricomponent polymer fibers, or plastic-coated mineral fibers such as thermoplastic coated glass fibers. Bicomponent fibers may be formed of two polymers combined to form fibers having a core of one polymer and a surrounding sheath of the other polymer. In particular, the bicomponent fibers may be arranged in a sheath-core, side-by-side, islands-in-the-sea, or segmented-pie arrangement. Preferably, the bicomponent fibers are formed in a sheath-core arrangement in which the sheath is formed of first polymer fibers which substantially surround the core formed of second polymer fibers. It is not required that the sheath fibers totally surround the core fibers. The first polymer fibers have a melting point lower than the melting point of the second polymer fibers so that upon heating the bicomponent fibers, the first and second polymer fibers react differently. For example, when the bicomponent fibers are heated to a temperature that is above the melting point of the first polymer fibers (sheath fibers) and below the melting point of the second polymer fibers (core fibers), the first polymer fibers will soften or melt while the second polymer fibers remain intact. This softening of the first polymer fibers (sheath fibers) will cause the first polymer fibers to become sticky and bond the first polymer fibers to themselves and other fibers that may be in close proximity.

Numerous combinations of materials can be used to make the bicomponent polymer fibers, such as, but not limited to, combinations using polyester, polypropylene, polysulfide, polyolefin, and polyethylene fibers. Specific polymer combinations for the bicomponent fibers include polyethylene terephthalate/polypropylene, polyethylene terephthalate/polyethylene, and polypropylene/polyethylene. Other non-limiting bicomponent fiber examples include copolyester polyethylene terephthalate/polyethylene terephthalate (co-PET/PET), poly 1,4 cyclohexanedimethyl terephthalate/polypropylene (PCT/PP), high density polyethylene/polyethylene terephthalate (HDPE/PET), high density polyethylene/polypropylene (HDPE/PP), linear low density polyethylene/polyethylene terephthalate (LLDPE/PET), nylon 6/nylon 6,6 (PA6/PA6,6), and glycol modified polyethylene terephthalate/polyethylene terephthalate (6PETg/PET).

In preferred embodiments, the fibers used to form the non-woven material are wet fibers, and most preferably are wet use chopped strand glass fibers (WUCS). WUCS fibers are low cost reinforcement fibers that provide impact resistance, dimensional stability, and improved mechanical properties such as improved strength and stiffness to the finished composite product. Wet use chopped strand glass fibers for use as the fibers in the non-woven material may be formed by conventional processes known in the art. It is desirable that the wet use chopped strand glass fibers have a moisture content from 1-30% of the incoming glass weight, and more preferably have a moisture content from 1-6%. The fibers may also be dry use chopped strand glass fibers (DUCS) or unbonded loose fill fibers. Desirably, the fibers are devoid of conventional sizing compositions. The fibers, may, however, include a trace amount of an oil and/or a trace amount of a silane to aid in processing, such as in removing the non-woven material from a mold.

As described above, the non-woven material may include any non-woven mat or veil such as air-laid mats, mats formed by a garnet/carding process (both single layer and multiple layers), high loft wet laid veils, and multiple layer wet laid veils formed of the same type of thermoplastic materials. With regard to the remainder of the application, reference will be made with respect to an air-laid mat, a preferred embodiment of the present invention.

The air-laid mat may be formed by dispersing the fiber material or materials into a fast moving air stream within a chamber. The fibers may have a diameter up to about 3 to 40 microns and may have a length from about 0.25 to about 6.0 inches. Preferably, the fibers have a diameter from about 10 microns to about 20 microns and a length from about 0.5 to about 1.5 inches. The fibers may be gathered and formed into a nonwoven mat on a moving, perforated, endless conveyor or screen within the chamber with the aid of a vacuum positioned below the perforated conveyor. The nonwoven fibrous mat is then heated, such as by conveying the mat through an oven, to evaporate any remaining water in the mat, such as water from wet use chopped strand glass fibers.

When there is a need to form a rigid surface or form a board-like structure out of the air-laid mat, the mat may be conveyed to an apparatus to densify or stiffen the air-laid mat. One example of a suitable apparatus is depicted in FIG. 1 and is described in detail in U.S. patent Publication 2004/0265553 and U.S. patent Publication 2005/0136235 to Rockwell et al., each of which is incorporated herein by reference in its entirety. Prior to heating the air-laid mat, a moisture additive is applied to a major surface of the air-laid mat. The moisture additive may include water and a dilute acid or a dilute alkali. Preferably, the moisture additive is water alone. Additional components such as additives to enhance the surface or to provide specific, desired features or characteristics may be added to the moisture additive. Examples of suitable additives include, but are not limited to, fire retardants, thermoset resins, latex, mold release agents, and water soluble adhesives. Any conventional liquid application method may be employed to apply the moisture additive to the air-laid mat. Examples of such methods include surface misting, application rollers, and spraying. The moisture additive may be applied to the surface of the air-laid mat in an amount sufficient to achieve from about 5 to about 7 grams of moisture additive per square foot of the air-laid mat. It is desirable that the moisture additive is applied to the surface of the air-laid mat in an amount of 6 grams or less per square foot.

As depicted in FIG. 1, the densifying apparatus 10 may be positioned downstream from the drying oven in a processing line for forming an air-laid mat (not shown). Alternatively, a pre-formed air-laid mat that includes thermoplastic materials or fibers and thermoplastic materials may be utilized. The term "pre-formed" as used herein is meant to indicate that the air-laid mat has been previously formed (e.g., off-line). In operation, the air-laid mat 15 is introduced into the densifying apparatus 10 through an entry 20 formed between first and second conveyor belts 12, 14. The air-laid mat 15 includes a first major surface 17 and a second major surface 18. As the air-laid mat 15 is fed by the conveyor belts 12, 14 into a treatment zone 16 defined by the distance between the first and second conveyor belts 12, 14, a moisture additive 30 is applied to one or more of the major surfaces 17, 18 of the air-laid mat 15. The first and second conveyor belts 12, 14 are simultaneously driven by a drive motor 13.

In the embodiment illustrated in FIG. 1, the moisture additive 30 is applied to the air-laid mat 15 by the first application device 32. After the moisture additive 30 has been applied to the major surface 17 of the air-laid mat 15, the mat 15 is heated by the first heating platen 22 that is independently controlled and heated by a first heating apparatus 25. Desirably, the air-laid mat 15 is heated to a temperature between about 225° F. and about 450° F. The heating platen 22 is vertically movable by a displacing device 23 to accommodate the thickness of the air-laid mat 15.

The high temperature generated by heating platen 22 rapidly heats the moisture additive 30 applied to the first major surface 17 and turns the water in the moisture additive 30 into steam. The steam, in turn, quickly heats the first major surface 17 of the air-laid mat 15, causing a molecular change in the polymer based thermoplastic material(s) of the air-laid mat 15 that was treated with the moisture additive 30. Thus, depending upon how much moisture additive 30 is applied and enters the air-laid mat 15, the amount (e.g., depth) of the polymer based thermoplastic materials that is molecularly changed varies. The molecular change in the polymer based thermoplastic material causes a portion extending from first major surface 17 of the lofty, air-laid mat 15 to become rigid, thereby forming a stiff or portion 27 having a certain thickness. Although not wishing to be bound by theory, it is believed that the water in the moisture additive 30 acts to convert the polymer based thermoplastic material component in the air-laid mat 15 into a more carbon-based form, thereby stiffening at least the portion of the air-laid mat 15 that is treated with the moisture additive 30.

After passing the heating platens 22, 24, the air-laid mat 15 having the densified layer or portion 27 is cooled by cooling platens 50 to set the thermoplastic polymer component. The upper cooling platen 50 is vertically movable by a displacing device 49 to accommodate the thickness of the air-laid mat 15.

In one exemplary embodiment, the first and/or second major surface 17, 18 of the air-laid mat 15 may include a facing material (not illustrated). Any add-on film may be utilized as a facing in the instant invention. Examples of facings useful in the present invention include polyester films, rayon films, metallic foil films, and combinations thereof. Still further, for certain applications, the stiffened thermoplastic air-laid mat may include a first facing layer on the first major surface 17 of the thermoplastic air-laid mat 15 and a second facing layer on the second major surface 18 of the thermoplastic air-laid mat 15.

The moisture additive 30 may be utilized to superficially treat, partially treat, or completely treat the air-laid mat 15 to achieve desired acoustic and thermal properties and/or stiffness in the final product. For example, the moisture additive 30 may be applied to the air-laid mat 15 in an amount sufficient to affect the molecular properties of the thermoplastic polymer material in the air-laid mat 15 a desired thickness extending inwardly from the first major surface 17 of the air-laid mat 15. The degree of penetration of the moisture additive 30 is directly correlated to the depth of molecular change of the thermoplastic polymer material. Thus, the more moisture additive 30 that is applied to the major surface 17, the greater the degree of penetration and molecular change of the thermoplastic polymer component of the air-laid mat 15. Thus, if it is desired that the air-laid mat 15 be superficially treated, a small amount of moisture additive 30 would be applied to the first major surface. On the other hand, if it is desired that the air-laid mat 15 be treated to a certain depth (i.e., partially treated), a larger amount of the moisture additive is applied to the first major surface 17. It is to be appreciated that the moisture additive 30 may be applied to the first major surface 17 in an amount sufficient to fully penetrate the air-laid mat 15 and cause a board-like product with stiffness throughout the end product. The stiffness of the surface of the air-laid mat 15 may be increased by about 20-25% over a conventional polymer processed material.

Figure 2:
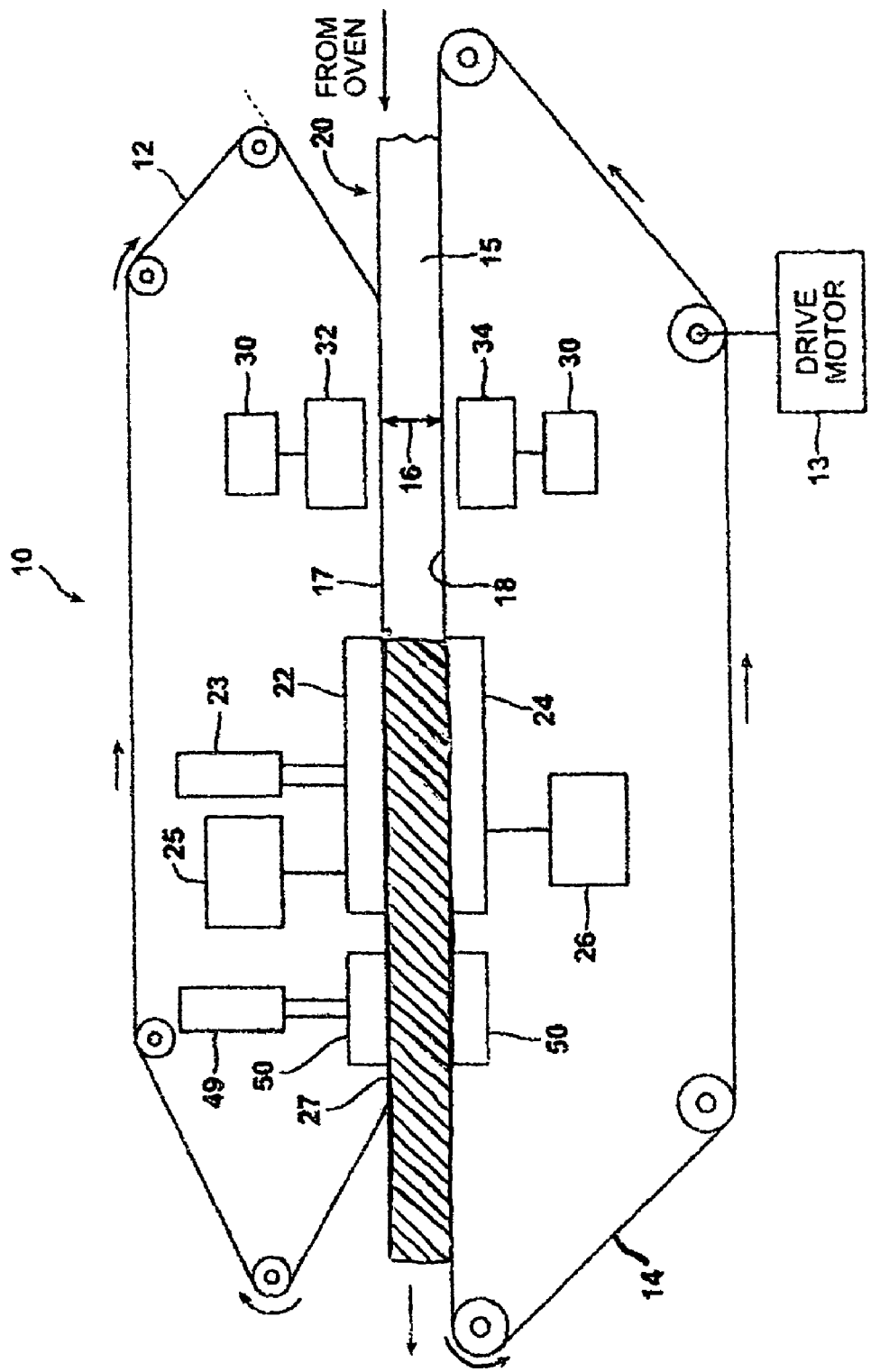
FIG. 2 is a schematic illustration of an apparatus for the application of a moisture additive to a second major surface and subsequent densification of an air-laid mat.

To treat the entire thickness of the air-laid mat 15 and form a stiffened board-like product, the moisture additive 30 may be applied to the second major surface 18 by the second application device 34 as shown in FIG. 2. The air-laid mat 15 is fed by the conveyor belts 12, 14 over the heating platen 24. The high temperature generated by heating platen 24 rapidly heats the moisture additive 30 applied to the second major surface 18 and turns the water in the moisture additive 30 into steam. The steam, in turn, rapidly heats the second major surface 18 of the air-laid mat 15 and rises through the air-laid mat 15, causing a molecular change in the polymer based thermoplastic material(s) throughout the air-laid mat 15. After passing the heating platen 24, the air-laid mat 15 having been densified into a board-like product is cooled by cooling platens 50.

Figure 3:
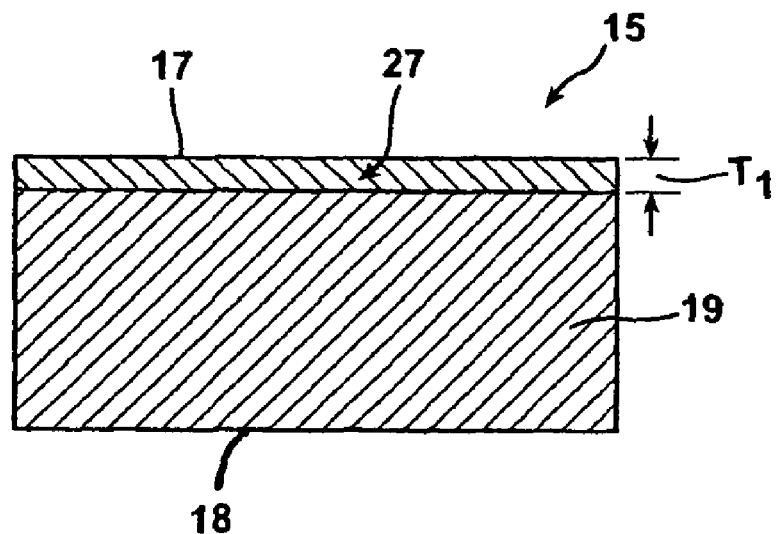
FIG. 3 is a schematic illustration of an acoustic product according to the present invention in which portion of an air-laid mat has been densified.

Examples of densified air-laid mats according to the present invention as described above are illustrated in FIGS. 3 and 4. In FIG. 3, the first major surface 17 of the air-laid mat 15 has been stiffened (densified) by the addition of the moisture additive and subsequent application of heat. The stiffened layer or portion 27 is formed a desired thickness ($T_1$) depending on the amount of moisture additive applied to the first major surface 17. The thickness ($T_1$) may be any thickness that extends partially into the air-laid mat 15. Because the first major surface 17 of the air-laid mat 15 in FIG. 3 has been treated, the second major surface 18 and an inner portion 19 of the air-laid mat remain lofty.

Figure 4:
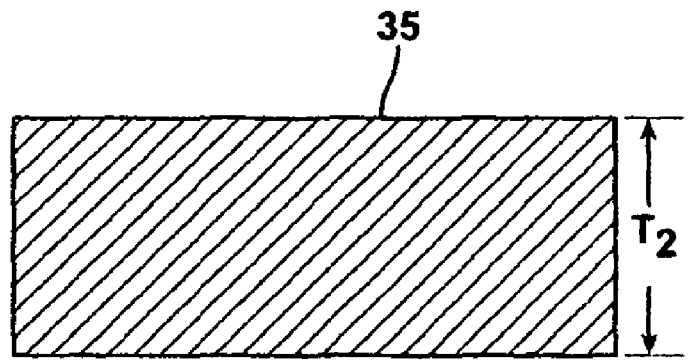
FIG. 4 is a schematic illustration of a board-like acoustic product in which the entire thickness of an air-laid mat has been densified.

In a second example shown in FIG. 4, the second major surface 18 was treated with the moisture additive. As discussed above, the steam generated by the application of heat to the air-laid mat rises through the mat. As a result, a board-like acoustic product 35 is formed in which the thermoplastic polymer material has been molecularly changed throughout the air-laid mat the thickness $T_2$ of the mat.

In an alternate embodiment of the present invention, an air-laid mat formed of (1) a polymer based thermoplastic material or (2) fibers and a polymer based thermoplastic material may be surface treated with the moisture additive on a major surface and molded by conventional molding techniques known by those of skill in the art. The moisture additive is desirably applied to the air-laid mat prior to placing the mat into the mold. Similar to the previously described embodiments, the heat from the molding process turns the water in the moisture additive to steam. The steam then reacts with the polymer based thermoplastic material(s) within the air-laid mat to stiffen at least the surface of the air-laid mat in contact with the mold. In particular, the reaction of the water with the polymer material in the air-laid mat creates a stiffened layer or area at least roughly equivalent to the depth of the moisture additive. The treated air-laid mat may be formed into any desired form by the molding process. For example, the air-laid mat may be formed into hood liners or dash insulators. It is to be noted that an air-laid mat formed entirely of polymer based materials and treated with the moisture additive approaches the stiffness of a molded fiberglass product.

Although the application of a moisture additive and the subsequent stiffening of the treated surface of an air-laid mat by heat processing has been described herein with respect to the apparatuses illustrated in FIGS. 1 and 2 and by conventional molding techniques, any method or device that can rapidly heat the surface of the moisture additive-treated air-laid mat to a temperature sufficient to convert the water in the moisture additive into steam (e.g., approximately 225° F.-approximately 450° F.) and cause a molecular change in the polymer based thermoplastic material(s) in the air-laid mat may be utilized.

The application of the moisture additive permits an acoustic product, e.g., an air-laid mat, to be converted into a board-like product having both acoustic, thermal, and structural properties. Conventionally, to achieve improved structural properties or strength, longer fibers were employed. However, longer fibers cause a reduction in acoustic properties. The present invention allows for the inclusion of smaller fibers, which retain the desired acoustic and thermal properties, while improving upon structural properties. Additionally, acoustic and thermal end products formed with stiffened surfaces or portions from the addition of the moisture additive have the ability to withstand the application of conventional mechanical fasteners such as nails, screws, tacks, and/or staples.

The addition of a moisture additive to an air-laid mat reduces the heat cycle time for an air-laid mat, thereby lowering processing time and manufacturing costs. In addition, air-laid mats processed with the moisture additive forms a product that possesses increased rigidity compared to conventionally steam treated acoustic products. The increased rigidity provides improved tensile strength to the final product and may permit lower gram weights of polymer materials to be utilized.

Another advantage of the present process is that the process permits the surface(s) of the air-laid mat to become rigid while a lofty portion is maintained. This allows for the production of end products with an appealing combination of strength and acoustical properties. Further, the end product formed by the present invention has good handling characteristics. The rigid surface(s) of the acoustical product are void of loose fibers which may catch on objects and pull out of the product during installation. In addition, the method of the invention permits the formation of a rigid surface without the use of boilers or steam generators utilized in conventional steam molding techniques.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. An acoustic product comprising:
an air-laid mat having a first major surface and a second major surface, said air-laid mat being formed of a plurality of randomly oriented glass fibers and a plurality of randomly oriented thermoplastic fibers,
wherein a first portion of said air-laid mat extending from said first major surface is densified by an application of a moisture additive and a subsequent application of heat, said moisture additive including water, and
wherein said densified portion extends a distance from said first major surface, said distance correlating to the amount of said moisture additive applied to said first major surface.

2. The acoustic product of claim 1, wherein a second portion of said air-laid mat extending from said second major surface is densified by an application of a moisture additive including water and a subsequent application of heat.

3. An acoustic product comprising:
an air-laid mat having a first major surface and a second major surface, said air-laid mat being formed of a plurality of randomly oriented glass fibers and a plurality of randomly oriented thermoplastic fibers,
wherein a first portion of said air-laid mat extending from said first major surface is densified by an application of a moisture additive and a subsequent application of heat, said moisture additive including water,
wherein a second portion of said air-laid mat extending from said second major surface is densified by an application of a moisture additive including water and a subsequent application of heat, and
wherein said first and second densified portions extend distances from said first and second major surfaces sufficient to densify an entire thickness of said air-laid mat.

4. The acoustic product of claim 3, wherein said thermoplastic fibers are multicomponent fibers selected from the group consisting of bicomponent fibers, tricomponent fibers and plastic-coated mineral fibers.

5. The acoustic product of claim 3, wherein said glass fibers and said thermoplastic fibers are devoid of sizing compositions.

6. An acoustic product comprising:
an air-laid mat having a first major surface and a second major surface, said air-laid mat being formed of a plurality of randomly oriented glass fibers and a plurality of randomly oriented thermoplastic fibers,
wherein a first portion of said air-laid mat extending from said first major surface is densified by an application of a moisture additive and a subsequent application of heat, said moisture additive including water,
wherein said glass fibers and said thermoplastic fibers are devoid of sizing compositions, and
wherein said glass fibers and said thermoplastic fibers include a trace amount of at least one member selected from the group consisting of an oil and a silane.

7. An acoustic product comprising:
an air-laid mat having a first major surface and a second major surface, said air-laid mat being formed of a plurality of randomly oriented glass fibers and a plurality of randomly oriented thermoplastic fibers,
wherein a first portion of said air-laid mat extending from said first major surface is densified by an application of a moisture additive and a subsequent application of heat, said moisture additive including water, wherein said moisture additive consists of water.

8. A densified non-woven material comprising:
a first portion formed of a plurality of randomly oriented theiinoplastic fibers, said first portion having a first density; and
a second portion formed of a plurality of said randomly oriented thermoplastic fibers, said second portion having a second density that is greater than said first density,
wherein said thermoplastic fibers in said second portion are densified by an application of a moisture additive to a surface of said second portion and a subsequent application of heat, said moisture additive including water, and
wherein said densified thermoplastic fibers in said second portion extend a distance from said surface of said second portion to a predetermined thickness.

9. The densified non-woven material of claim 8, wherein said thermoplastic fibers are devoid of a sizing composition.

10. The acoustic product of claim 1, wherein said thermoplastic fibers are multicomponent fibers selected from the group consisting of bicomponent fibers, tricomponent fibers and plastic-coated mineral fibers.

11. The acoustic product of claim 1, wherein said glass fibers and said thermoplastic fibers are devoid of sizing compositions.

12. The acoustic product of claim 7, wherein a second portion of said air-laid mat extending from said second major surface is densified by an application of a moisture additive including water and a subsequent application of heat.

13. The acoustic product of claim 7, wherein said thermoplastic fibers are multicomponent fibers selected from the group consisting of bicomponent fibers, tricomponent fibers and plastic-coated mineral fibers.

14. The acoustic product of claim 7, wherein said glass fibers and said thermoplastic fibers are devoid of sizing compositions.

15. The acoustic product of claim 8, wherein said thermoplastic fibers are multicomponent fibers selected from the group consisting of bicomponent fibers, tricomponent fibers and plastic-coated mineral fibers.

* * * * *